United States Patent
Zheng et al.

(10) Patent No.: US 10,831,834 B2
(45) Date of Patent: Nov. 10, 2020

(54) UNSUPERVISED DOCUMENT SUMMARIZATION BY ATTENTION AND RECONSTRUCTION

(71) Applicant: SAP SE, Walldorf (DE)

(72) Inventors: Xin Zheng, Singapore (SG); Aixin Sun, Singapore (SG)

(73) Assignee: SAP SE, Walldorf (DE)

( * ) Notice: Subject to any disclaimer, the term of this patent is extended or adjusted under 35 U.S.C. 154(b) by 207 days.

(21) Appl. No.: 16/200,872

(22) Filed: Nov. 27, 2018

(65) Prior Publication Data
US 2020/0167391 A1 May 28, 2020

(51) Int. Cl.
| | |
|---|---|
| *G06F 16/93* | (2019.01) |
| *G06F 16/34* | (2019.01) |
| *G06F 16/33* | (2019.01) |
| *G06F 40/30* | (2020.01) |

(52) U.S. Cl.
CPC .......... *G06F 16/93* (2019.01); *G06F 16/3347* (2019.01); *G06F 16/345* (2019.01); *G06F 40/30* (2020.01)

(58) Field of Classification Search
CPC .................................................. G06F 16/345
USPC .................................................. 707/E17.094
See application file for complete search history.

(56) References Cited

U.S. PATENT DOCUMENTS

| | | | |
|---|---|---|---|
| 2002/0103836 A1* | 8/2002 | Fein | G06F 40/35 |
| 2015/0095770 A1* | 4/2015 | Mani | G06F 16/93 |
| | | | 715/254 |
| 2016/0259778 A1* | 9/2016 | Cookson | G06F 40/284 |
| 2017/0161372 A1* | 6/2017 | Fernandez | G06F 40/268 |
| 2018/0096057 A1 | 4/2018 | Zheng et al. | |

OTHER PUBLICATIONS

U.S. Appl. No. 15/623,071, Zheng, Xin, filed Jun. 14, 2017.
U.S. Appl. No. 15/940,041, Zheng, Xin, filed Mar. 29, 2018.
U.S. Appl. No. 16/152,553, Zheng et al., filed Oct. 5, 2018.

* cited by examiner

*Primary Examiner* — Baoquoc N To
(74) *Attorney, Agent, or Firm* — Fish & Richardson P.C.

(57) ABSTRACT

Methods, systems, and computer-readable storage media for processing, through an encoder of an attention-reconstruction-based summarization (ARS) platform, the primary document to provide a contextual vector, identifying, using reconstruction regularizers of the ARS platform, information that is absent from the one or more linking documents, and is present in the primary document at least partially based on the contextual vector, for each word of the primary document, providing, using an attention mechanism of the ARS platform, a word salience score at least partially based on the information that is absent from the one or more linking documents, for each sentence in the primary document, determining a sentence salience score based on word salience scores of words within the sentence, ranking sentences of the primary document based on sentence salience scores, and selecting two or more sentences of the primary document based on ranking to provide a summary of the primary document.

20 Claims, 4 Drawing Sheets

US 10,831,834 B2

UNSUPERVISED DOCUMENT SUMMARIZATION BY ATTENTION AND RECONSTRUCTION

BACKGROUND

Information retrieval systems can be used to identify electronic documents (e.g., books, papers, web pages, in electronic form) that may be relevant to users. For example, a user can submit a query to an information retrieval system, and electronic documents determined to be relevant to the query can be provided to the user. Other systems can also convey documents to users. For example, multiple documents can be conveyed to users in a forum, and/or as reports for events (e.g., burst events).

In some systems, electronic documents can be summarized. In this manner, a summary (e.g., abstract) of an electronic document can be provided to a user, for example, such that the user can determine whether the electronic document is of interest. Such systems can identify, and/or summarize electronic documents based on words present in the document.

SUMMARY

Implementations of the present disclosure are directed to document summarization. More particularly, implementations of the present disclosure are directed to unsupervised document summarization using attention and reconstruction.

In some implementations, actions include processing, through an encoder of an attention-reconstruction-based summarization (ARS) platform, the primary document to provide a contextual vector, identifying, using reconstruction regularizers of the ARS platform, information that is absent from the one or more linking documents, and is present in the primary document at least partially based on the contextual vector, for each word of the primary document, providing, using an attention mechanism of the ARS platform, a word salience score at least partially based on the information that is absent from the one or more linking documents, for each sentence in the primary document, determining a sentence salience score based on word salience scores of words within the sentence, ranking sentences of the primary document based on sentence salience scores, and selecting two or more sentences of the primary document based on ranking to provide a summary of the primary document. Other implementations of this aspect include corresponding systems, apparatus, and computer programs, configured to perform the actions of the methods, encoded on computer storage devices.

These and other implementations can each optionally include one or more of the following features: each word salience score is provided as a position-dependent word salience score that is dependent upon a position of the respective word within the primary document; the reconstruction regularizers include a primary document reconstruction regularizer that provides a hidden representation of the primary document, and a linking document-primary document reconstruction regularizer that provides hidden representations of primary document and linking document pairs, wherein the information that is absent from the linking documents is identified at least partially based on the hidden representations; the primary document reconstruction regularizer includes an autoencoder process that encodes the primary document into the hidden representation, and decodes from the hidden representation to a reconstructed primary document; a word salience score for a respective word is determined by summing relative saliences of the word, each sentence salience score is determined as an average of word salience scores of words in the respective sentence; and each linking document includes a link to the primary document.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
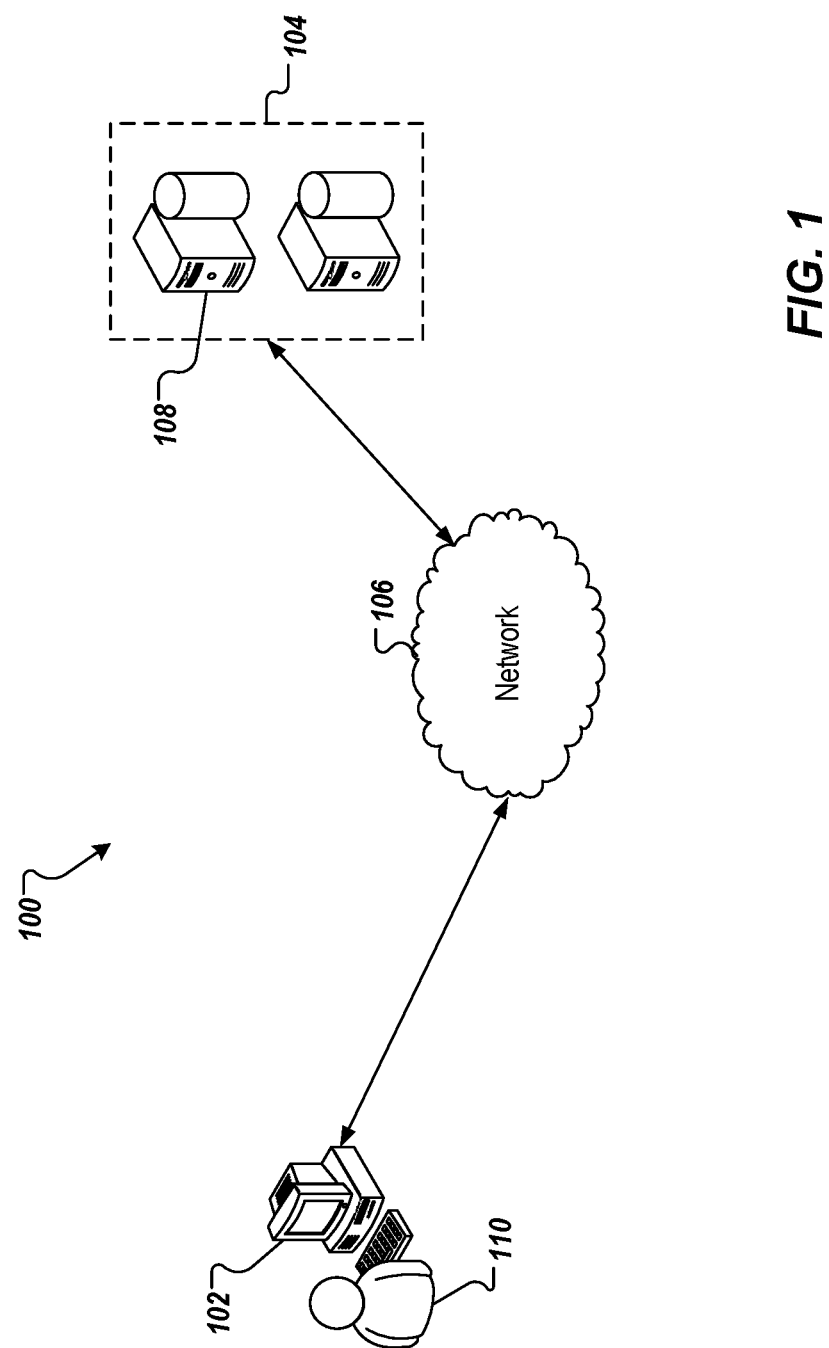
FIG. 1 depicts an example architecture that can be used to execute implementations of the present disclosure.

Implementations of the present disclosure are directed to document summarization. More particularly, implementations of the present disclosure are directed to unsupervised document summarization using attention and reconstruction Implementations can include actions of processing, through an encoder of an attention-reconstruction-based summarization (ARS) platform, the primary document to provide a contextual vector, identifying, using reconstruction regularizers of the ARS platform, information that is absent from the one or more linking documents, and is present in the primary document at least partially based on the contextual vector, for each word of the primary document, providing, using an attention mechanism of the ARS platform, a word salience score at least partially based on the information that is absent from the one or more linking documents, for each sentence in the primary document, determining a sentence salience score based on word salience scores of words within the sentence, ranking sentences of the primary document based on sentence salience scores, and selecting two or more sentences of the primary document based on ranking to provide a summary of the primary document.

To provide further context for implementations of the present disclosure, in the last decades, many websites and blogs (e.g., news websites and blogs) allow readers to comment on their published content (e.g., news articles). The content, and readers' comments open opportunities to better understand readers and to study what information in the content attracts readers' attention. The published content, and readers' comments can define a new type of document that can be summarized (e.g., comments-oriented document summarization). In some examples, the term primary documents refers to published webpages. For example, a webpage including a news article can be referred to as a primary document (e.g., a primary source of content). In recent years, many web sites have done away with online reader comments section. One of the reasons for this is that many conversations between readers have moved to social media, and online forums, making comments on web sites redundant.

For example, it is common to find secondary documents that reference primary documents. In some examples, the term secondary documents (also referred to as linking documents) refers to, for example, and without limitation, online forums, and social media posts that link to one or more primary documents. For example, a social media post (e.g., a tweet in the Twitter platform) can include one or more uniform resource locators (URLs) linking to other content (e.g., news articles, webpages). Consequently, these are referred to as secondary documents (e.g., linking documents (tweets)).

Each secondary document can be considered a comment to the linked primary document(s) (e.g., linked through the URL). In some examples, a primary document, and a secondary document linked thereto, can be collectively considered a document (e.g., as studied in comments-oriented document summarization). However, secondary documents are not equal. For example, linking social media posts, and linking reader comments are written for different targeted audience. The targeted audience of a reader comment is other readers reading the content of the primary document, while the audience of the social media post is followers of the particular social media user.

To better understand the relationship between primary documents, and linking documents, an analysis can be performed on an example dataset. An example dataset includes a news-tweets dataset that includes linking tweets to news articles. From the example dataset, it is observed that linking tweets collectively cover the most important points in the linked news, but miss other important pieces of information reported in the news. For example, from the linking tweets of a news article on the Boston bombing, it is revealed that the suspect deleted an important Instagram account. However, we can only learn from the news article that digital traces remain for the deleted posts, because no linking tweets mention this point. It is also observed that many linking tweets are not directly relevant to the linked news article. One possible reason is that the targeted audience of a linking tweet is the followers of the particular user, and they share the common context to interpret the linking tweet.

As introduced above, implementations of the present disclosure are directed to summarization of documents. Summarization can be categorized into extractive and abstractive methods. Supervised approaches are employed by both types of summarization. In an example approach, a recurrent neural network (RNN)-based encoder-decoder process is applied to extract sentences and words. In another example approach, sentences of a primary document are ranked by sentence salience scores, which are estimated through both hand-crafted features and contextual information explored by an attentive neural model. In another example approach, a classifier is provided to select summary sentences based on features generated by a neural network. In still another example approach, sentences are ranked by similarities between representations of sentences and summaries, where the representations are refined by multi-task learning.

Recently, with the development in language generation, abstractive summarization has gained interest. In one example approach, a neural language model is applied to generate headline sentences. This example approach has been extended by replacing the neural language model with an attentive RNN. Other example approaches implement an attention mechanism to solve this task. For example, one example approach, combines topic sensitive PageRank with an attention model to assign weights for sentences with respect to their relevance to the topic. In another example approach, variational inference is applied to an attentive sequence-to-sequence model in order to address the intractable posterior inference for the recurrent latent variables. Other example approaches incorporate a pointer network with an attentive sequence-to-sequence model together to deal with rare and unseen words by copying source text for summary generation. Still another example approach uses a coverage mechanism to relieve repetition issues of a sequence-to-sequence model.

However, an obstacle for supervised summarization approaches is the lack of reference summaries for training. Especially for deep learning methods, large amounts of training data is necessary.

Unsupervised document summarization approaches are largely applied to extractive summarization. One example approach ranks sentences with a degree-based graph model. Also, integer linear programming (ILP) is a widely adopted framework for unsupervised summarization. For example, another example approach applies ILP to select and merge noun/verb phrases based on their salience scores. The scores are estimated through concept-based weights and position information. Another example approach adopts a two stages that estimate sentence and phrase salience scores using an auto-encoder framework.

Another type of unsupervised approach to document summarization is based on a reconstruction mechanism. One example approach reconstructs each sentence by a non-negative linear combination of the selected summary sentences. Another example approach follows a similar idea, but it minimizes the reconstruction error through a neural network. Still another example approach adopts a two-level sparse representation model and reconstructs the document by considering different constraints.

In view of the lack of reference summaries, linking documents (secondary documents) that linking to primary documents (e.g., news articles) is explored. For example, a comments-oriented document summarization has been proposed, which incorporates both web document and online comments to construct a summary. In another example, social media posts have been leveraged to guide summary construction, where summary sentences are selected from both the primary document, and high quality linking documents, such that the summaries cover key points in linking documents. In another example, linking documents are used in a query-biased summarization fashion, where document-related linking documents are used as queries, and the most novel sentences from primary document are selected as the summary.

Other approaches seek to extract fine grained information from tweets to facilitate summarization. One example approach explores hand-crafted features from primary documents, and linking documents to rank sentences in a supervised manner. Later, secondary document information is encoded as edge weights of a dependency tree for summary sentence compression. In another example approach the focus of the primary documents and readers' interests revealed by comments are jointly considered for multi-document summarization. However, these approaches do not consider sequential context information, and do not tackle semantic relationship between primary documents and linking documents well.

In reviewing secondary documents (e.g., linking tweets) it can be seen that the linking documents are mixed with comments (e.g., readers' opinions), summaries, references, and unrelated content, or noise. In view of this, a data analysis can be conducted on primary documents, and linking documents to better understand the relationships between them. In accordance with implementations of the present disclosure, the data analysis is based on the example dataset introduced above (e.g., news-tweets dataset). This dataset includes news articles and linking tweet. Tweets that are relatively short (e.g., less than 5 tokens) and that are suspected copies of news titles and highlights are removed. The example dataset contains 121 news articles, and 78,419 linking tweets. The number of linking tweets for each news article ranges from 200 to 22,000. Because tweets are noisy, clean-up can be used to remove the hashtag sign (#), @ account, URLs, and other symbols. To avoid redundancy, retweets or near duplicate tweets are removed. The cleaned dataset used in the data analysis includes 14,692 tweets linking to 121 news articles.

From the data analysis, it is observed that linking tweets collectively suggest or highlight important information reported in a news article. In some examples, the data analysis quantitatively evaluates "the extent of usefulness" of linking tweets for news summarization. Word importance estimated from tweets is used for the evaluation. Specifically, word salience scores are determined based on tweets using (TFIDF). For tweets linking to the same new articles, each is considered as one linking document, and the TFIDF scores for words in each tweet are calculated. The average TFIDF values are taken as the word salience score. The salience of a news sentence can be provided as the average of word salience scores in the sentence. If a word does not appear in any tweet, the salience score is 0. The top X sentences (e.g., 4 sentences) with the highest sentence salience scores are selected as the news summary. This relatively simple summarization can be referred to as Tweets-TFIDF.

To evaluate the effectiveness of Tweets-TFIDF, it can be compared to another example approach, LexRank, a classic extractive summarization method. As depicted in Table 1, below, Tweets-TFIDF outperforms LexRank by 3 points with respect to F1 on ROUGE-1. This result suggests that linking tweets can capture important information reported in news articles.

TABLE 1

Performance Comparison using ROUGE-1

| Approach | Precision (%) | Recall (%) | F1 (%) |
| --- | --- | --- | --- |
| LexRank | 19.74 | 43.53 | 26.64 |
| Tweets-TFIDF | 25.84 | 38.41 | 29.67 |

From the data analysis, it is observed that linking tweets do not cover all the information reported in a news article. More particularly, the data analysis investigates "to what extent" the information reported in a news article is covered by its linking tweets. Since word is the smallest unit that conveys meaningful information, the information coverage is tested at the word level. In some examples, the ratio of overlapping words, which appear in both news and linking tweets, is calculated over the vocabulary of linking tweets and that of news. The calculation is based on word surface form. That is, semantic meaning is not taken into consideration to avoid making the problem over complicated. Nevertheless, stop words are removed from both news and linking tweets before the calculation. The ratio values are mapped to predefined bins. For example, there are 15 news articles of which the ratios of overlapping words against vocabulary of each article's linking tweets are within 10% to 20%. It was seen that, for most news articles, the overlapping words with linking tweets only take up no more than 30% of news vocabulary. Accordingly, it can be argued that a lot of information reported in news is not revealed in linking tweets. It can also be seen that the overlapping words do not reach 50% of linking tweets vocabulary most of the time. The remaining words may reveal opinions, additional related information, or unrelated noise, for example.

In summary, the data analysis of the present disclosure shows that (i) linking tweets do highlight important information reported in news, and (ii) linking tweets do not fully cover information reported in news articles.

In view of the above context, implementations of the present disclosure provide an unsupervised, linking document-aware, primary document summarization platform, which is referred to as an attention-reconstruction-based summarization (ARS) platform. In some implementations, the ARS platform includes attentive information extraction, reconstruction regularization, and sentence selection. As described in further detail herein, the ARS platform summarizes primary documents (e.g., news) by considering both information highlighted by linking documents (e.g., linking tweets), and important information contained in the primary documents, but absent from the linking documents. The ARS platform of the present disclosure also minimizes the impact of noise in linking documents.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host an ARS platform that processes a set of primary documents (e.g., news articles), and a set of secondary (linking) documents (e.g., reader comments, social media posts) to provide a summary for each primary documents.

As introduced above, the ARS platform of the present disclosure summarizes primary documents (e.g., news) by considering both information highlighted by linking documents (e.g., linking tweets), and important information contained in the primary documents, but absent from the linking documents), and minimizes the impact of noise in linking documents.

Figure 2:
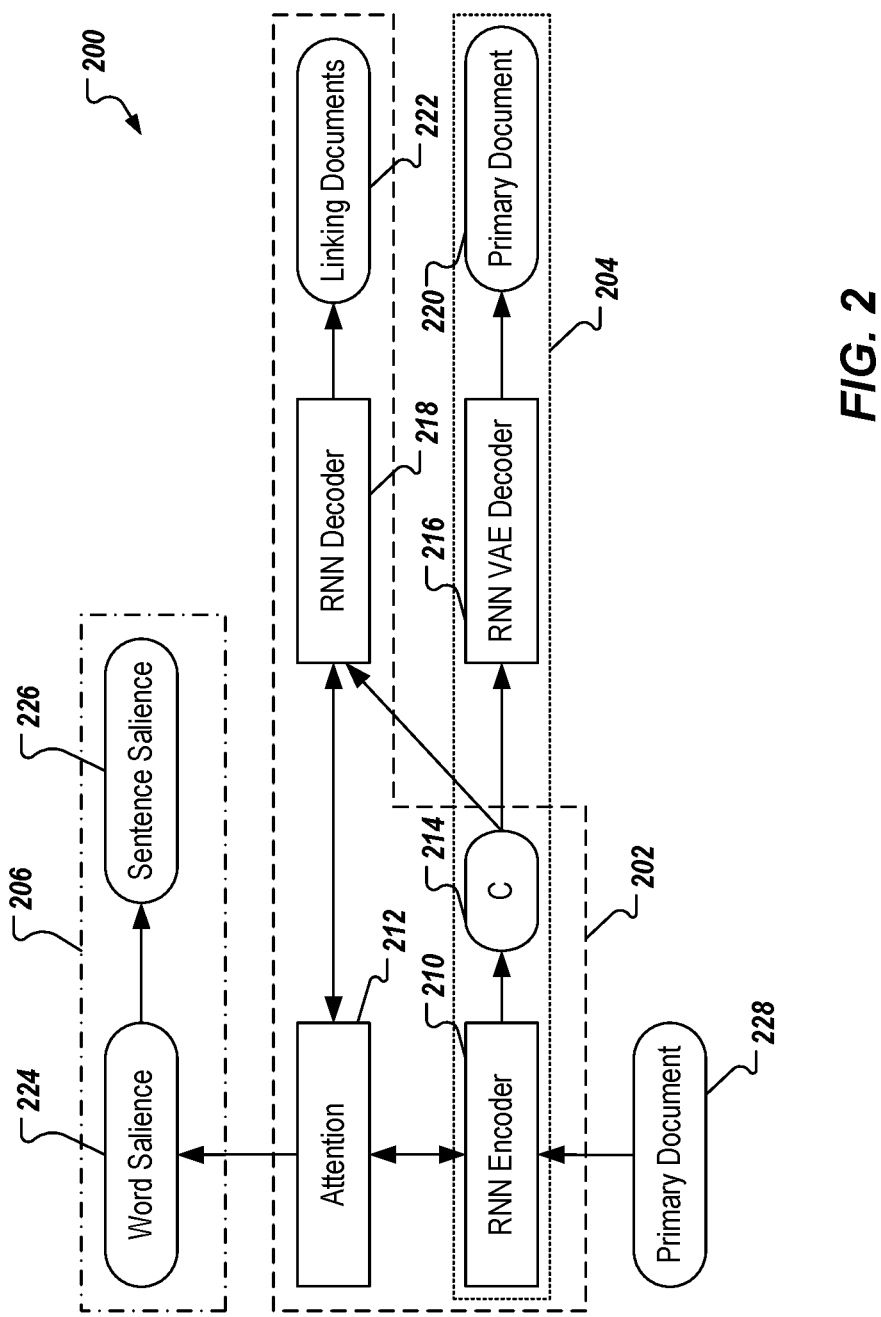
FIG. 2 depicts an example conceptual architecture that can be used to execute implementations of the present disclosure.

FIG. 2 depicts an example conceptual architecture 200 that can be used to execute implementations of the present disclosure. The example conceptual architecture 200 depicts the ARS platform of the present disclosure. In accordance with FIG. 2, the ARS platform includes an attentive information extraction (AIE) 202, reconstruction regularization 204, and sentence selection 206. In the example of FIG. 2, the AIE 202 includes an encoder 210, an attention mechanism 212, a contextual vector 214, a second decoder 218, and reconstructed linking documents 222. The reconstruction regularization 204 includes the encoder 210, the contextual vector 214, a first decoder 216, and a reconstructed primary document 220. The sentence selection 206 receives word salience scores 224 from the AIE 202, and provides sentence salience scores 226 to identify sentences to be included in a summary of a primary document 228.

In some implementations, the AIE addresses information highlighted in linking documents with respect to a primary document through an attentive sequence-to-sequence model. In some implementations, reconstruction regularization is used to cover information in a primary document that is not revealed in linking documents. It can be noted that, generally, the usage of encoder-decoder structure is to generate sequences with the decoder. However, implementations of the present disclosure obtain the attention values, which are fine-tuned with model training. The attentions are adopted for word and sentence salience estimation, as described herein.

With regard to AIE, the linking documents are expected to be generated based on the primary document that they are linked to. To model the correlations between a linked document, and a primary document, a sequence-to-sequence framework is used. More particularly, a primary document (e.g., a news article) X, and a linking document (e.g., a linking tweet) Y form a document pair. The primary document is fed into an RNN encoder (e.g., the encoder 202 of FIG. 2), and the linking document is fed into the decoder. In some examples, the linking documents are provided as input to the decoder (e.g., the second decoder 218) during training.

In some implementations, the RNN encoder is a bidirectional gated recurrent unit (GRU). Each primary document is composed of a sequence of sentences $X=\{s_q|q\in[1,|X|]\}$, and each sentence includes a sequence of words $s_q=\{x_i|i\in[1,|s_q|]\}$. The vocabulary V includes all of the words in the primary documents, and the linking documents. In some examples, the sentences of the primary document are concatenated in order as one sequence. In this manner, the input for each encoding step is a word representation. Each word is represented by a distributed word vector mapped by a word embedding matrix $E\in\mathbb{R}^{d\times|V|}$. In some examples, the word embedding matrix is constructed from Glove, and pre-trained Word2Vec on both the primary documents, and the linking documents. For example, if a word appears in the vocabulary of Glove, the embedding comes from Glove. Otherwise, the embedding is from the pre-trained Word2Vec. At each encoding step, the hidden representations are provided on both directions, and are concatenated as the hidden vector at each step $h_i^{enc}=[\overleftarrow{h_i}^T;\overrightarrow{h_i}^T]^T$. The hidden representation of the last step is considered as encoder contextual vector c (e.g., the contextual vector 214 of FIG. 2).

In some examples, the RNN decoder also utilizes GRU to generate corresponding predicted linking documents. The predicted words of the predicted linking documents share the same embedding matrix E as encoder inputs. At the training stage, words in the linking documents are provided as inputs to the RNN decoder. In this manner, the RNN decoder learn the decoding targets. In some examples, a symbol ⟨s⟩ is added before the first word $y_1$ of each linking document to indicate the start of a sentence. The decoding target is the linking document itself, and a symbol ⟨s/⟩ is added after the last word $y_n$ of a linking document to denote the end of a sentence. At each decoding step, the hidden representation is generated from previous output, previous hidden representation, and encoder contextual vector $h_j^{dec}=f(y_{j-1}, h_{j-1}^{dec}, c)$. At the first decoding step, the encoder contextual vector c acts as a previous hidden representation. At the training stage, words in decoder input serve as the previous output. The decoder targets are used to calculate the loss with predicted results.

The RNN suffers from remembering long sequence information. The attention mechanism is introduced to alleviate the heavy burden, and address different relevance between encoder and decoder hidden states. Instead of generating decoder hidden states based on a static encoder contextual vector c, an exclusive encoder contextual vector $c_j$ is produced based on the relationship between encoder hidden states and the previous decoder hidden state as follows:

$$p(y_j|y_1,\ldots,y_{j-1},x)=g(y_{j-1},h_j^{dec},c_j) \quad (1)$$

$$h_j^{dec}=f(y_{j-1},h_{j-1}^{dec},c_j)$$

$$c_j=\sum_{i=1}^{|X|}\alpha_{ij}h_i^{enc}$$

-continued $$\alpha_{ij} = \frac{\exp(e_{ij})}{\sum_{k=1}^{|X|} \exp(e_{kj})}$$

$$e_{ij} = v_a^T \tanh(W_e h_i^{enc} + W_d h_{j-1}^{dec})$$

where $W_e$, $W_d$ and $v_a$ are trainable parameters. The probability of a predicted word at step j is obtained from a softmax operation on the final layer representation of decoder state j, whose dimension is the same as vocabulary size $|V|$. The objective function for sequence-to-sequence framework are defined as negative log likelihood, as follows:

$$\mathcal{L}_s = -\Sigma_{(X,Y) \in D} \log p(Y'|X;\theta) \qquad (2)$$

With the attention mechanism, at each decoding step, an alignment relationship $\alpha_{ij}$ between each decoded word $y_j$ in the linking documents with each word $x_i$ in the primary document is obtained by considering contextual information, which is encoded in hidden states. Therefore, the attention weights of words in the primary document could be considered as their relative salience scores at each position with local context. It can be assumed that the relative importance of a word at different positions is different, because of the different contexts. In view of this. implementations of the present disclosure estimate position-dependent word saliences, instead of a constant salience score for each word. To obtain a synthetic salience score for each word $x_i$ in the primary document at different positions, the relative saliences of each word $x_i$ are summed over all of the decoding steps (i.e., over all of the words $y_j$ in linking documents). For example:

$$\beta_i = \Sigma_{j=1}^{|Y|} \alpha_{ij} \qquad (3)$$

As described herein, linking documents collectively highlight important information reported in primary documents. Consequently, word saliences β need not be recorded for each primary document—linking document pair. On the other hand, all of the parameters including attentions are not stable during the training stage. In view of this, implementations of the present disclosure calculate word saliences at an inference stage, which means that the model converges to a stable state. By feeding each primary document into the RNN encoder, the attentions and word saliences can be obtained. It can be noted that, at the inference stage, no input is needed for the RNN decoder. With all of the primary document—linking document pairs training the model, the word saliences β obtained at the inference stage reflect the information in the primary documents collectively highlighted by the linking document. In fact, word saliences should not be estimated solely based on the correlations between linking documents, and primary, as discussed herein.

In accordance with implementations of the present disclosure, position-dependent word saliences are further refined by reconstruction regularization. As described above, linking documents do not cover all of the information in primary documents. Further, linking documents contain noise. To capture the information in primary documents that is not covered by linking documents, and to reduce the effect of noise, implementations of the present disclosure use reconstruction regularization. In some implementations, the reconstruction regularization includes primary document reconstruction, and linking document-primary document reconstruction.

In some implementations, primary document reconstruction is provided as an autoencoder process that encodes a primary document into hidden representation, then decodes from the representation vector to a reconstructed primary document (e.g., the reconstructed primary document 220 of FIG. 2). The process is used to generate comparison hidden vector for linking document-primary document reconstruction regularizer, as described in further detail below. In some examples, the RNN VAE decoder is implemented, which is an efficient approach to rebuild the input with reparameterization. In some examples, the RNN VAE decoder shares the same embedding matrix E, and RNN encoder with previous sequence-to-sequence framework. In this manner, the estimation of word salience scores would not be dominated by linking documents, as it will be affected by primary document reconstruction regularizer. The encoder contextual vector c is fed into the RNN VAE decoder.

The objective for the RNN VAE decoder is to reproduce original input from the hidden representation, formulated as:

$$p_\theta(x) = \int p_\theta(x|z) p_\theta(z) dz \qquad (4)$$

where $z \in \mathbb{R}^K$ is the hidden representation which can reconstruct an input x. By introducing a recognition model $q_\varphi(z|x)$ to approximate the posterior $p_\theta(z|x)$, the lower bound of the objective is:

$$\mathcal{L}_v = \log p_\theta(x) - D_{KL}[q_\varphi(z|x) \| p_\theta(z|x)] \qquad (5)$$

$$= \mathbb{E}_{z \sim q}[\log p_\theta(x|z)] - D_{KL}[q_\varphi(z) \| p_\theta(z)]$$

where $D_{KL}$ denotes Kullback-Leibler divergence. In some examples, the value $D_{KL}[q_\varphi(z|x) \| p_\theta(z|x)]$ is made to be small, and the parameters θ and φ are jointly learned. In some examples, the above loss function can be rewritten as:

$$\mathbb{E}_{z \sim q}[\log p_\theta(x|z)] = -\Sigma_{x \in D} \log p(X'|X; \theta, \varphi)$$

$$D_{KL}[q_\varphi(z) \| p_\theta(z)] = -\tfrac{1}{2} \Sigma_{i=1}^K (1 + \log(\sigma_i^2) - \mu_i^2 - \sigma_i^2) \qquad (6)$$

In some examples, it can be assumed that both prior and posterior of the latent variables follow Gaussian distribution:

$$p_\theta(z) \sim \mathcal{N}(0, I), q_\varphi(z|x) \sim \mathcal{N}(z; \mu, \sigma^2 I) \qquad (7)$$

Mean μ and standard deviation σ can be computed from the encoder contextual vector c, through linear layers. For example:

$$\mu = W_{c\mu} c + b_{c\mu}$$

$$\log(\sigma^2) = W_{c\sigma} c + b_{c\sigma} \qquad (8)$$

The latent vector z can be obtained through reparameterization from the estimated μ and σ, as follows:

$$z = \mu + \varepsilon \sigma \qquad (9)$$

where $\varepsilon \sim \mathcal{N}(0, I)$ is a noise sampled from Gaussian distribution.

Using the latent vector z, the conditional probability $p_\theta(x|z)$ can be calculated through a decoding process. Here, the attentive GRU framework can be adopted as decoder, which is denoted as the RNN VAE decoder. It can be noted that each of the hidden states in the encoder is calculated the same as contextual vector c to z as in Equation 9 when performing attention alignment in the VAE decoding process. The probability of output word in prediction process is estimated similar to Equation 1.

With regard to linking document-primary document reconstruction, by exploring the correlations between primary documents and linking documents, the important information in primary documents revealed by linking documents could be captured through the attention mechanism.

To some extent, linking documents can be considered pseudo-summaries for primary documents. In view of this, linking documents can be made approximate summaries in the hidden vector space. Again, based on the idea of reconstruction, the hidden representations of each linking document, and primary document can be pushed closer. Because the primary document can be reconstructed its hidden representation, most of the primary document information should also be able to be rebuilt from similar linking document representation. By doing so, implementations of the present disclosure capture the information in the primary document that is not mentioned in linking documents, and alleviate the effect of noise in the linking documents.

In further detail, z is taken as the representation for a primary document, which is used to reconstruct the primary document itself. A linking document representation can be formulated from the last step hidden vector $h_{|Y|}^{dec}$ in the RNN decoder, which represents the linking document target. To make the two hidden vectors comparable, a linear layer can be applied on $h_{|Y|}^{dec}$:

$$d_z = W_h h_{|Y|}^{dec} + b_h \qquad (10)$$

where $d_z$ is taken as the linking document representation. The cosine similarity can be measured between two representations with the aim to reduce the distance between them. The linking document-primary document reconstruction regularizer is formulated as:

$$\mathcal{L}_r = 1 - \cos(d_z, z) \qquad (11)$$

In accordance with implementations of the present disclosure, the training process for the whole model works in multi-task learning schema. The AIE, and the reconstruction regularization are trained together with different targets. Adding in the linking document-primary document reconstruction regularizer, the loss function for the whole model becomes:

$$\mathcal{L} = \mathcal{L}_s + \mathcal{L}_v + \lambda \mathcal{L}_r \qquad (12)$$

where $\lambda$ is a hyperparameter with an experimentally set the value.

In accordance with implementations of the present disclosure, with two reconstruction regularizers, word salience scores are estimated not only from correlations between primary documents, and linking documents, but also from information in primary documents not mentioned by linking documents. In this manner, it can be considered that word salience scores capture important information from both linking tweets and news at different positions. In some implementations, the salience scores of all words (except stop words) in a sentence are averaged to provide the sentence salience score. For example:

$$w_s = \frac{1}{|s|} \sum_{i=1}^{|s|} \beta_i \qquad (13)$$

The top X ranked sentences with highest sentence salience scores are selected to be a summary for the respective primary document (e.g., the top 4 sentences).

Figure 3:
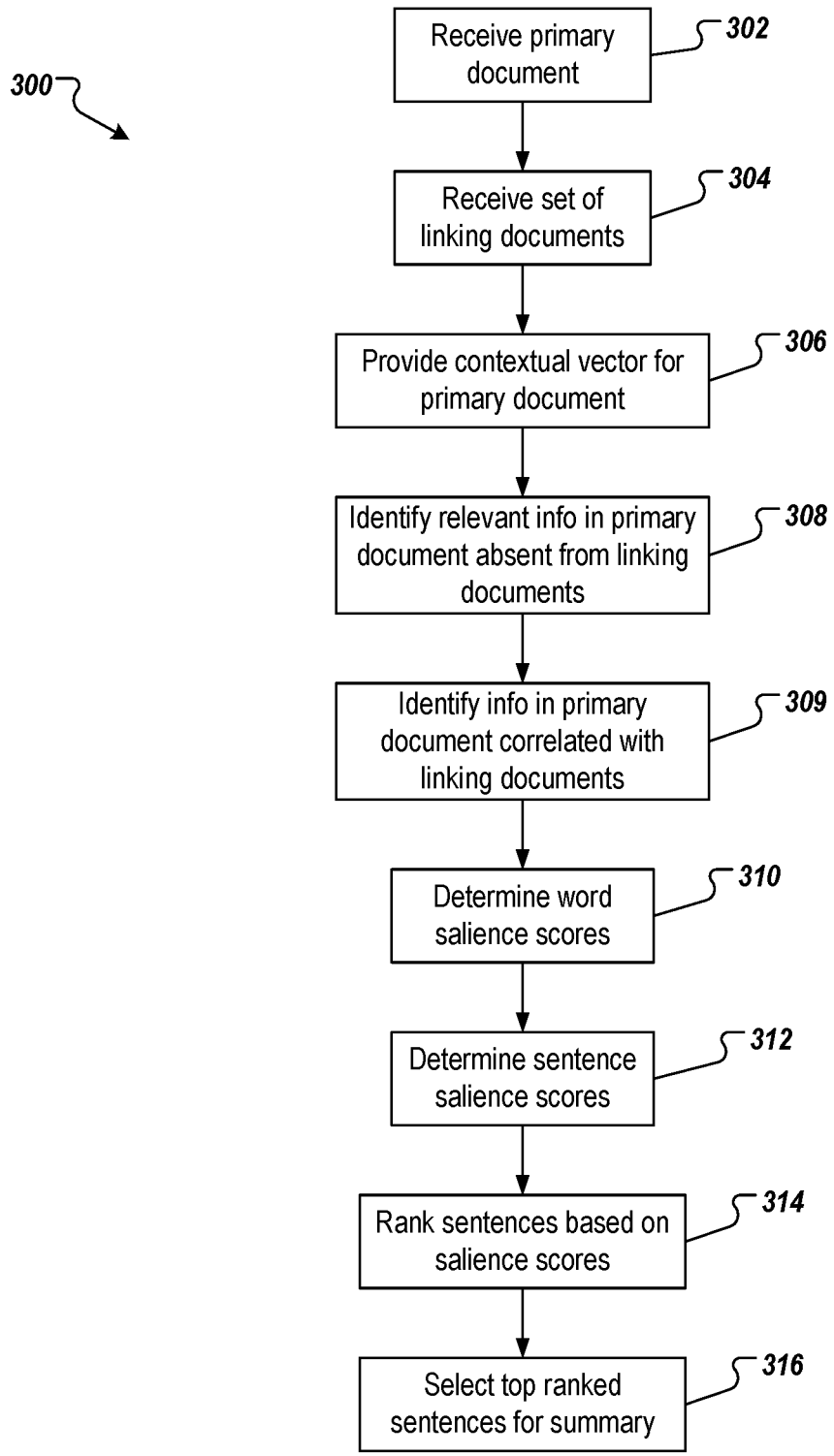
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices.

A primary document is received (302). For example, a news article, published on a web page is received by the ARS platform of the present disclosure. A set of linking documents is received (304). For example, one or more, social media posts (e.g., tweets) that link to the primary document (e.g., include a URL of the primary document) are received by the ARS platform as a set of linking documents.

A contextual vector for the primary document is provided (306). For example, the ARS platform processes the primary document is processed through the AIE 202 of FIG. 2 to provide the contextual vector c 214, as described in detail herein. Relevant information in the primary document that is absent from the linking documents is identified (308). For example, the contextual vector c 214, and the linking documents are processed through the reconstruction regularizer 204 of FIG. 2 (e.g., the primary document reconstruction regularizer, and linking document-primary document reconstruction regularizer), as described herein. As also described herein, using reconstruction, the hidden representations of each linking document, and the primary document can be pushed closer, and most of the primary document information can be rebuilt from similar linking document representations. In this manner, information included in the primary document, but absent from the linking documents can be identified (e.g., a difference between hidden representation based on the primary document, and hidden representations based on the linking documents represents the absent information).

Relevant information in the primary document is identified based on correlations with the linking documents is identified (308). For example, and as described herein, the AIE 202 of FIG. 2 identifies information of the primary document that is highlighted in the linking documents. Word salience scores are determined (310). For example, the AIE 202 of FIG. 2 provides word salience scores for each word in each sentence of the primary document. As described herein, word salience scores are estimated not only from correlations between the primary document, and the linking documents, but also from information in primary documents not mentioned by linking documents. In this manner, it can be considered that word salience scores capture important information from both linking documents and the primary document at different positions.

Sentence salience scores are determined (312). For example, and as described herein, the salience scores of all words (except stop words) in a sentence are averaged to provide the sentence salience score for a respective sentence. Consequently, a set of sentence salience scores is provided, each sentence salience score representing a relative significance of a respective sentence within the primary document. Sentences are ranked based on salience scores (314). Top ranked sentences are selected for a summary of the primary document (316). For example, the top X (e.g., top 4) sentences are selected for the summary.

Figure 4:
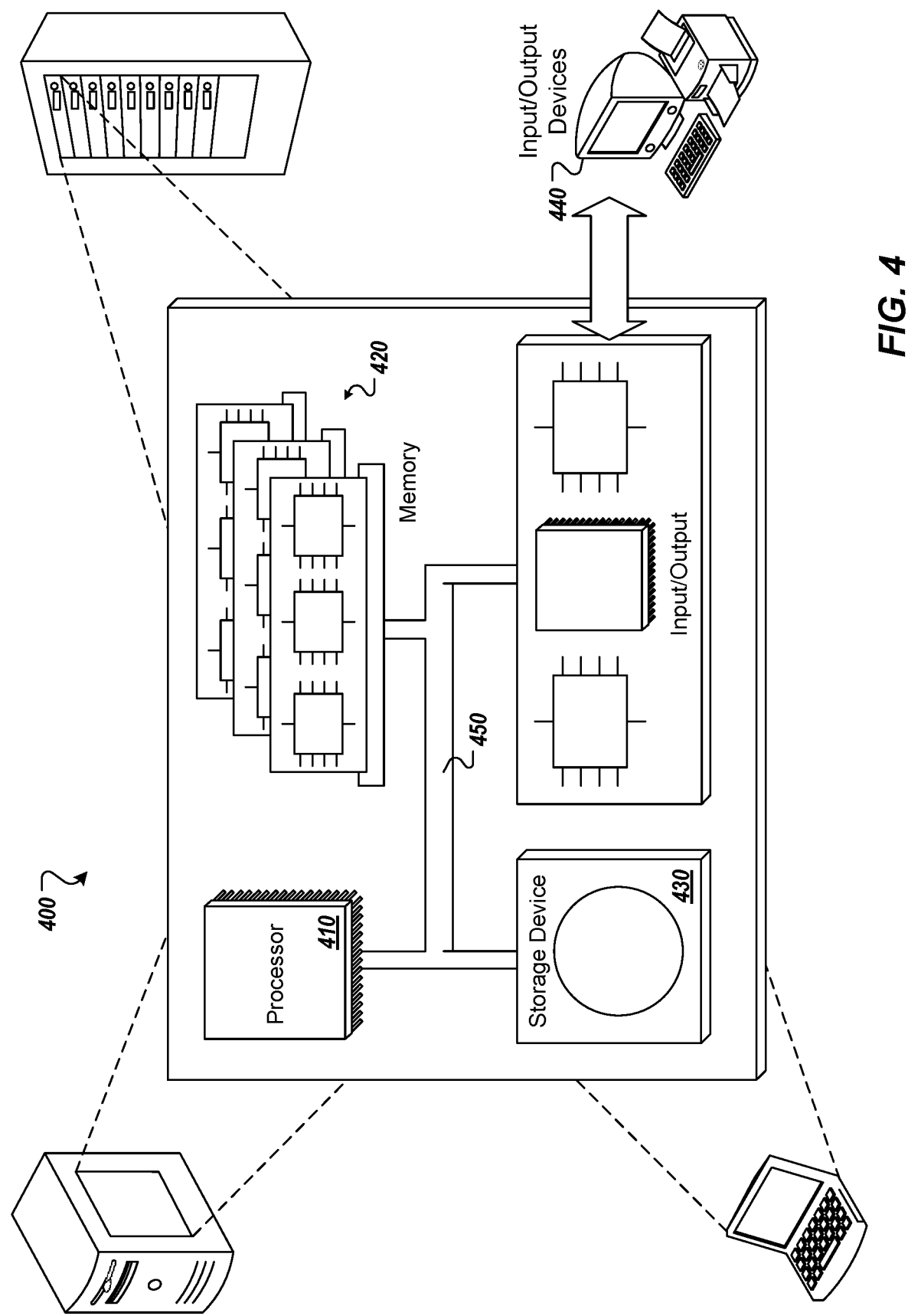
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing a summary of a primary document associated with one or more linking documents, the method being executed by one or more processors and comprising:
    processing, through an encoder of an attention-reconstruction-based summarization (ARS) platform, the primary document to provide a contextual vector;
    identifying, using reconstruction regularizers of the ARS platform, information that is absent from the one or more linking documents, and is present in the primary document at least partially based on the contextual vector;
    for each word of the primary document, providing, using an attention mechanism of the ARS platform, a word salience score at least partially based on the information that is absent from the one or more linking documents, and information of the primary document that correlates to information in the one or more linking documents;
    for each sentence in the primary document, determining a sentence salience score based on word salience scores of words within the sentence;
    ranking sentences of the primary document based on sentence salience scores to provide a ranking; and
    selecting two or more sentences of the primary document based on the ranking to provide a summary of the primary document.

2. The method of claim 1, wherein each word salience score is provided as a position-dependent word salience score that is dependent upon a position of the respective word within the primary document.

3. The method of claim 1, wherein the reconstruction regularizers comprise a primary document reconstruction regularizer that provides a hidden representation of the primary document, and a linking document-primary document reconstruction regularizer that provides hidden representations of primary document and linking document pairs, wherein the information that is absent from the linking documents is identified at least partially based on the hidden representations.

4. The method of claim 3, wherein the primary document reconstruction regularizer comprises an autoencoder process that encodes the primary document into the hidden representation, and decodes from the hidden representation to a reconstructed primary document.

5. The method of claim 1, wherein a word salience score for a respective word is determined by summing relative saliences of the word.

6. The method of claim 1, wherein each sentence salience score is determined as an average of word salience scores of words in the respective sentence.

7. The method of claim 1, wherein each linking document comprises a link to the primary document.

8. A non-transitory computer-readable storage medium coupled to one or more processors and having instructions stored thereon which, when executed by the one or more processors, cause the one or more processors to perform operations for providing a summary of a primary document associated with one or more linking documents, the operations comprising:
  processing, through an encoder of an attention-reconstruction-based summarization (ARS) platform, the primary document to provide a contextual vector;
  identifying, using reconstruction regularizers of the ARS platform, information that is absent from the one or more linking documents, and is present in the primary document at least partially based on the contextual vector;
  for each word of the primary document, providing, using an attention mechanism of the ARS platform, a word salience score at least partially based on the information that is absent from the one or more linking documents, and information of the primary document that correlates to information in the one or more linking documents;
  for each sentence in the primary document, determining a sentence salience score based on word salience scores of words within the sentence;
  ranking sentences of the primary document based on sentence salience scores to provide a ranking; and
  selecting two or more sentences of the primary document based on the ranking to provide a summary of the primary document.

9. The computer-readable storage medium of claim 8, wherein each word salience score is provided as a position-dependent word salience score that is dependent upon a position of the respective word within the primary document.

10. The computer-readable storage medium of claim 8, wherein the reconstruction regularizers comprise a primary document reconstruction regularizer that provides a hidden representation of the primary document, and a linking document-primary document reconstruction regularizer that provides hidden representations of primary document and linking document pairs, wherein the information that is absent from the linking documents is identified at least partially based on the hidden representations.

11. The computer-readable storage medium of claim 10, wherein the primary document reconstruction regularizer comprises an autoencoder process that encodes the primary document into the hidden representation, and decodes from the hidden representation to a reconstructed primary document.

12. The computer-readable storage medium of claim 8, wherein a word salience score for a respective word is determined by summing relative saliences of the word.

13. The computer-readable storage medium of claim 8, wherein each sentence salience score is determined as an average of word salience scores of words in the respective sentence.

14. The computer-readable storage medium of claim 8, wherein each linking document comprises a link to the primary document.

15. A system, comprising:
  a computing device; and
  a computer-readable storage device coupled to the computing device and having instructions stored thereon which, when executed by the computing device, cause the computing device to perform operations for providing a summary of a primary document associated with one or more linking documents, the operations comprising:
    processing, through an encoder of an attention-reconstruction-based summarization (ARS) platform, the primary document to provide a contextual vector;
    identifying, using reconstruction regularizers of the ARS platform, information that is absent from the one or more linking documents, and is present in the primary document at least partially based on the contextual vector;
    for each word of the primary document, providing, using an attention mechanism of the ARS platform, a word salience score at least partially based on the information that is absent from the one or more linking documents, and information of the primary document that correlates to information in the one or more linking documents;
    for each sentence in the primary document, determining a sentence salience score based on word salience scores of words within the sentence;
    ranking sentences of the primary document based on sentence salience scores to provide a ranking; and
    selecting two or more sentences of the primary document based on the ranking to provide a summary of the primary document.

16. The system of claim 15, wherein each word salience score is provided as a position-dependent word salience score that is dependent upon a position of the respective word within the primary document.

17. The system of claim 15, wherein the reconstruction regularizers comprise a primary document reconstruction regularizer that provides a hidden representation of the primary document, and a linking document-primary document reconstruction regularizer that provides hidden representations of primary document and linking document pairs, wherein the information that is absent from the linking documents is identified at least partially based on the hidden representations.

18. The system of claim 17, wherein the primary document reconstruction regularizer comprises an autoencoder process that encodes the primary document into the hidden representation, and decodes from the hidden representation to a reconstructed primary document.

19. The system of claim 15, wherein a word salience score for a respective word is determined by summing relative saliences of the word.

20. The system of claim 15, wherein each sentence salience score is determined as an average of word salience scores of words in the respective sentence.

* * * * *